United States Patent

Lichtblau

[11] Patent Number: 4,751,516
[45] Date of Patent: Jun. 14, 1988

[54] ANTENNA SYSTEM FOR MAGNETIC AND RESONANT CIRCUIT DETECTION

[76] Inventor: George J. Lichtblau, 23 Pin Pack Rd., Ridgefield, Conn. 06877

[21] Appl. No.: 690,165

[22] Filed: Jan. 10, 1985

[51] Int. Cl.⁴ .......................................... H01Q 11/12
[52] U.S. Cl. ................................... 343/742; 343/741
[58] Field of Search .............. 343/741, 742, 743, 744; 340/572

[56] References Cited

U.S. PATENT DOCUMENTS 4,251,808  2/1981  Lichtblau ........................... 343/842
4,373,163  2/1983  Vandebult .......................... 343/842

Primary Examiner—William L. Sikes
Assistant Examiner—Robert E. Wise
Attorney, Agent, or Firm—Weingarten, Schurgin, Gagnebin & Hayes

[57] ABSTRACT

For use in an electronic security system, an antenna system which provides a magnetic field which is substantially zero at distances large compared to the dimensions of the antenna, and has magnetic coupling between transmitting and receiving antennas which can be readily predetermined by varying the relative sizes of the antenna loops. The size and shape of the detection pattern can also be readily predetermined by varying the relative sizes of the antenna loops. Preferably, the transmitting and receiving antennas each comprise three magnetic loops lying in a single plane, the center loop having a magnetic phase which is in phase opposition to that of the upper and lower loops. The sum of the three magnetic dipoles is equal to zero to provide a net magnetic field as seen from distances large compared to the antenna dimension, which is substantially zero.

Each antenna is substantially symmetrical about a centerline through the middle loop, and the antenna is driven at the geometric center of the loop such that the magnetic field caused by the opposite symmetrical sections of the antenna are in phase opposition and cause substantial cancellation of the magnetic field at distances large compared to the dimensions of the antenna. Alternatively, the antenna can be driven at an end of one of the outer loops. The number of turns of the center loop is different from the number of turns of the two outer loops. The ratio of the number of turns of the center loop to that of the outer loops, and the ratio of the area of the center loop to that of the outer loops is determined to provide an intended net magnetic coupling between the transmitting and receiving antennas and a net magnetic field of zero at large distances. The antenna system can thereby be easily tailored to suit specific installations to permit intended coupling of a carrier signal from the transmitting to the receiving antenna and to provide an intended spacing between the transmitting and receiving antennas.

35 Claims, 2 Drawing Sheets

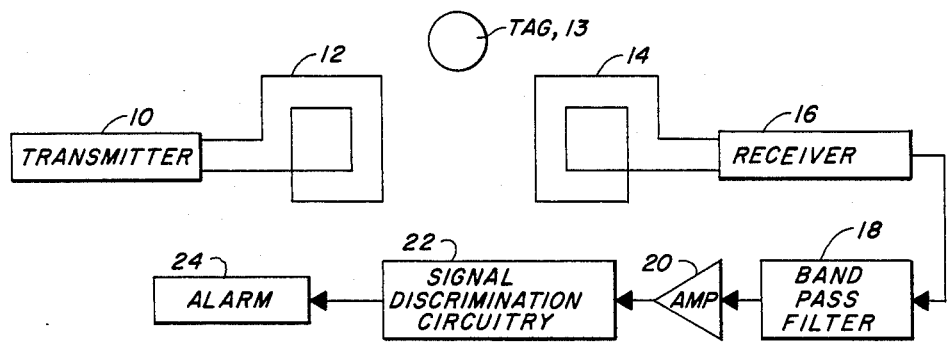
FIG. 1
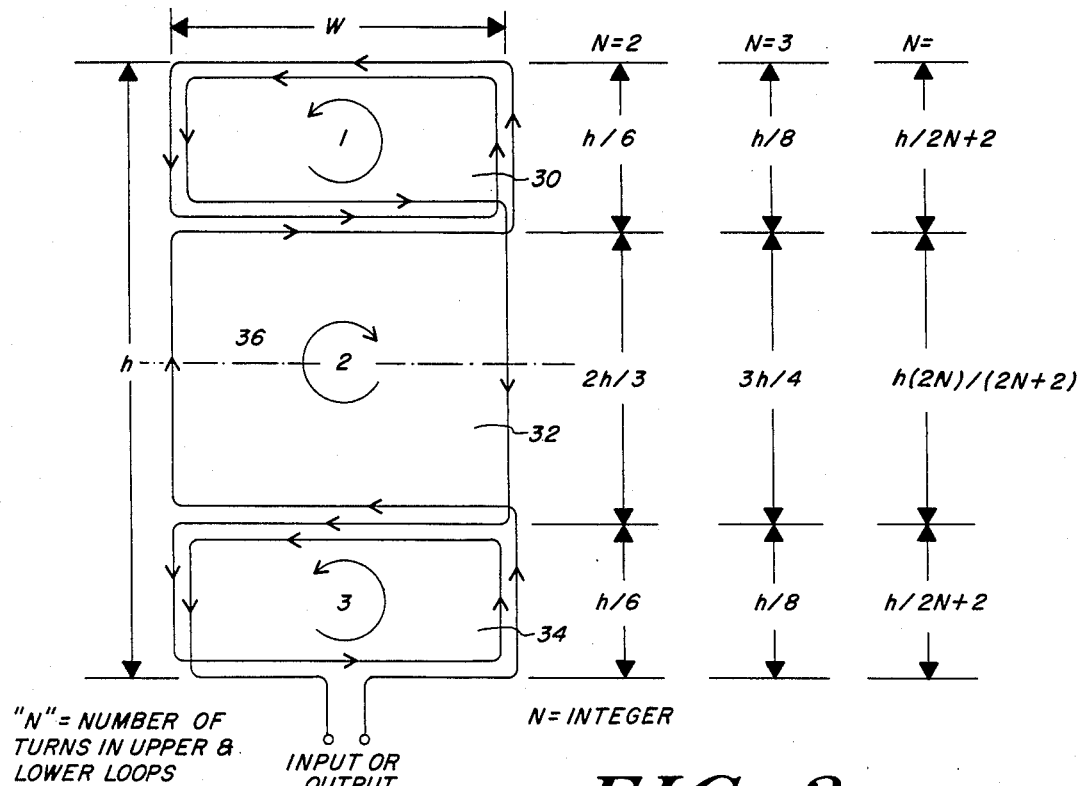
FIG. 2
FIG. 3

ANTENNA SYSTEM FOR MAGNETIC AND RESONANT CIRCUIT DETECTION

FIELD OF THE INVENTION

This invention relates to electronic security systems and more particularly to an antenna system therefor.

BACKGROUND OF THE INVENTION

Electronic security systems are known for the detection of the unauthorized removal of items from a store, library or other facility. These systems are often employed in retail stores to thwart shoplifting, and in libraries to prevent book theft. Most of the commercially useable security systems are based on the detection of a disturbance in an electromagnetic or magnetic field established in a zone of surveillance. A tag or target in the surveillance zone causes the field disturbance. In those systems which employ a radio frequency electromagnetic field, the tag is usually a resonant circuit sharply tuned to produce an abrupt change in the electromagnetic field when the frequency of the applied field passes through the resonant frequency of the tag. In systems providing a low frequency magnetic field, the tag is typically a high permeability magnetic strip which can abruptly saturate to cause an abrupt change in the magnetic field.

A transmitter and associated antenna provides the electromagnetic or magnetic field in a surveillance zone, and a receiver and associated antenna is operative to detect the presence of the tag as determined by the sensible change in the interrogation field. Upon such detection, an alarm is sounded or other output alarm indication provided.

A preferred electronic security system for the detection of resonant tag circuits is described in U.S. Pat. Nos. 3,810,147; 3,863,244; and 3,967,161. In the system of these patents, an electromagnetic field is provided which is repetitively swept over a predetermined frequency range, the resonant tag having at least one resonant frequency within the swept frequency range. Each time the field passes or sweeps through the resonant frequency of the tag, an abrupt change in the field occurs which is sensed to produce an alarm output.

Magnetic systems are similarly operative and are shown for example in U.S. Pat. Nos. 3,665,449 and 3,747,086.

In electronic security systems such as those described above, two loop antennas are usually employed, one for transmitting and one for receiving. The transmitting loop antenna generates an electromagnetic field which extends far beyond the immediate area of the security system necessary for system operation. In addition, the receiving antenna is sensitive to external noise generated at great distances from the receiver relative to the small area of interest to system operation.

An antenna system is described in U.S. Pat. No. 4,016,553 in which the inherent problems of a simple loop antenna in an electronic security system are minimized by use of two or more identical parallel loop antennas connected in phase opposition or bucking relationship. The antenna system comprises a cluster of at least two parallel electrically conductive loops of similar size connected in phase opposition so that current always flows in mutually opposite directions through corresponding portions of each loop. As a result, the loops are magnetically arranged in a bucking relationship. The length of and spacing between the loops is small compared to the wavelength of the transmitted or received signals and is disclosed to be typically one tenth of the wavelength. The spacing between the parallel loops is an appreciable fraction, for example one fourth, of the width of the egress passage through which a detectable resonant circuit must pass in a security installation. A separate antenna cluster composed of phase opposed parallel loops can be connected to the respective transmitter and receiver of the system, or a single antenna cluster can be employed with both the transmitter and receiver. At distances large compared to the dimensions of the transmitting antenna, the generated electromagnetic waves are cancelled by reason of the phase opposed loop connection. At short distances between the receiving and transmitting antennas, the signals in adjacent parallel antenna conductors do not cancel, resulting in a net detectable signal. Electromagnetic waves incident on the receiving antenna from distances large compared to the antenna dimensions do not provide a sensible antenna signal, but electromagnetic waves from sources close to the antenna are sensed to provide a receiving antenna signal.

Thus the antenna system described in U.S. Pat. No. 4,016,553 provides an electromagnetic field in an interrogation region while preventing high intensity fields from occurring outside of the interrogation region. This antenna system also provides detection of selected electromagnetic fields originating in the interrogation region from a resonant circuit while avoiding detection of fields originating from outside of the interrogation region.

The antenna system described in the aforesaid U.S. Pat. No. 4,016,553 suffers several disadvantages in practice. The bucking loop antennas must be separated by a significant distance relative to the distance between the transmitting antenna cluster and receiving antenna cluster. Moreover, the bucking loop antennas must be carefully aligned and balanced for optimum effect. The loops of an antenna cluster are typically spaced apart from each other by a distance corresponding to one fourth the distance across the egress passage. The size of the antenna cluster can become cumbersome for passage widths of conveniently large dimension. For example, for a passage width of six feet, the antenna cluster must be sufficiently large to accommodate a loop spacing of eighteen inches.

An improved antenna system for use with an electronic system for the detection of resonant tag circuits is the subject of U.S. Pat. No. 4,243,980 of the same inventor as herein, and comprises a pair of substantially identical planar multiple loop antennas respectively connected to the transmitter and receiver of the security system and providing an electromagnetic field of high intensity in the interrogation region of the system while preventing high intensity fields at distances outside of the interrogation region which are large in comparison to the antenna dimensions. The antenna system also discriminates against interferring signals originating outside of the interrogation region at distances large compared with the antenna dimensions. Each planar antenna includes two or more loops lying in a common plane, with each loop being twisted 180° with respect to each adjacent loop to be in phase opposition. The transmitting antenna and receiving antenna are symmetrical, that is, identical or nearly so with respect to the number and size of the two or more loops, and are cooperative in that twisted loops of the receiving antenna reverse or decode the adjacent phase relationships of the twisted loops of the transmitting antenna. For each antenna, the total loop area of one phase is equal to the total loop area of the opposite phase in order to minimize the magnetic field generated by the transmitter at distances large compared to the dimensions of the antenna and in order to reject noise at the receiving antenna which is generated at distances large compared to the dimensions of the receiving antenna. The antenna system is also effective to provide higher resonant tag detection sensitivity than conventional loop antennas.

A further improved antenna system is described in U.S. Pat. No. 4,260,990 of the same inventor as herein, in which the two cooperating planar antennas are not symmetrical to each other. The transmitting antenna can be a single loop planar antenna while the receiving antenna can include two or more loops lying in a common plane with each loop being twisted 180° with respect to each adjacent loop. Alternatively, the transmitting antenna can have two planar loops and the receiving antenna three planar loops, the loops of each antenna lying in a common plane with each loop being twisted 180° with respect to each adjacent loop to bein phase opposition.

The antenna systems of the '980 and '990 patents are effective to reject radio frequency interference generated by magnetic fields at distances from the antenna large compared to the antenna dimensions. However, such antennas are still susceptible to electrical noise which is coupled capacitively to the antenna.

An antenna system is the subject of U.S. Pat. No. 4,251,808, of the same inventor, which is not sensitive to capacitively coupled noise and which enjoys the advantages of electromagnetic noise rejection as in the systems of the '980 and '990 patents. In the antenna system of U.S. Pat. No. 4,251,808, each multiple loop planar antenna is substantially enclosed within a conductive shield to substantially eliminate capacitive coupling of noise to the antenna. Each multiple loop antenna is enclosed within a metal or other conductive shield which is grounded to provide a shorted turn around the periphery of the multiple loop antenna. The crosswires of the twisted loops are enclosed within a shield portion which is electrically separated from the shorted turn so that no electrical current path is provided through the crossover shield portion. The antenna is totally shielded from capacitive coupling to external sources of noise or spurious signals. If the antenna is perfectly balanced, no currents flow in the shorted turn of the shield since no net voltages are induced into the shield by the antenna magnetic field. If there is a small unbalance in the multiple loop antenna such that a voltage is induced into the shorted turn of the shield, the current flowing in the shield loop tends to cancel out the magnetic unbalance, and thus the shorted shield loop automatically corrects for small unbalances in the multiple loop antenna and reduces the magnetic fields external to the loop at distances outside of the interrogation region.

SUMMARY OF THE INVENTION

The antenna system of the present invention provides a magnetic field which is substantially zero at distances large compared to the dimensions of the antenna, and has magnetic coupling between the transmitting and receiving antennas which can be readily predetermined by varying the relative sizes of the antenna loops. The size and shape of the detection pattern can also be readily predetermined by varying the relative sizes of the antenna loops. In one preferred embodiment, the transmitting and receiving antennas each comprise three magnetic loops lying in a single plane, the center loop having a magnetic phase which is in phase opposition to that of the upper and lower loops. The sum of the three magnetic dipoles is equal to zero to provide a net magnetic field as seen from distances large compared to the antenna dimension, which is substantially zero. In one preferred embodiment, the upper and lower loops each have two turns of wire around the same area, and the center loop has a single turn of wire. The loops are connected in series such that current around all loops is equal. The area of the center loop is two-thirds of the total loop area, and the area of each upper and lower loop is one-sixth of the total loop area.

Each antenna is substantially symmetrical about a centerline through the middle loop, and the antenna is driven at the centerline of the loop such that the magnetic field caused by the opposite symmetrical sections of the antenna are in phase opposition and cause substantial cancellation of the magnetic field at distances large compared to the dimensions of the antenna. Alternatively, the antenna can be driven at an end of one of the outer loops. The number of turns of the center loop is different from the number of turns of the two outer loops. The ratio of the number of turns of the center loop to that of the outer loops, and the ratio of the area of the center loop to that of the outer loops is determined to provide an intended net magnetic coupling between the transmitting and receiving antennas and a net magnetic field of zero at large distances. The antenna system can thereby be easily tailored to suit specific installations to permit intended coupling of a carrier signal from the transmitting to the receiving antenna and to provide an intended spacing between the transmitting and receiving antennas.

The invention can also be embodied in a shielded antenna version which can be either end driven or center driven, and in which the antenna is enclosed in a conductive pipe or tube which serves as a Faraday shield against electrostatic and capacitive fields.

Although preferably the transmitting and receiving antennas are of the same configuration, each embodying the principles of the invention, it is not necessary that they be identical. The receiving antenna should be constructed in accordance with the invention. The transmitting antenna can be of other configurations, such as a single loop, or of the types shown in the aforesaid U.S. Pat. Nos. 4,243,980; 4,260,990; and 4,251,808.

DESCRIPTION OF THE DRAWINGS

The invention will be more fully understood from the following detailed description taken in conjunction with the accompanying drawings, in which:

FIG. 1 is a diagrammatic representation of an electronic security system in which the antenna system of the present invention can be employed;

FIG. 2 is a diagrammatic representation of an antenna system in accordance with the invention;

FIG. 3 is a schematic diagram useful in illustrating principles of operation of the embodiment of FIG. 2;

DETAILED DESCRIPTION OF THE INVENTION

Figure 4:
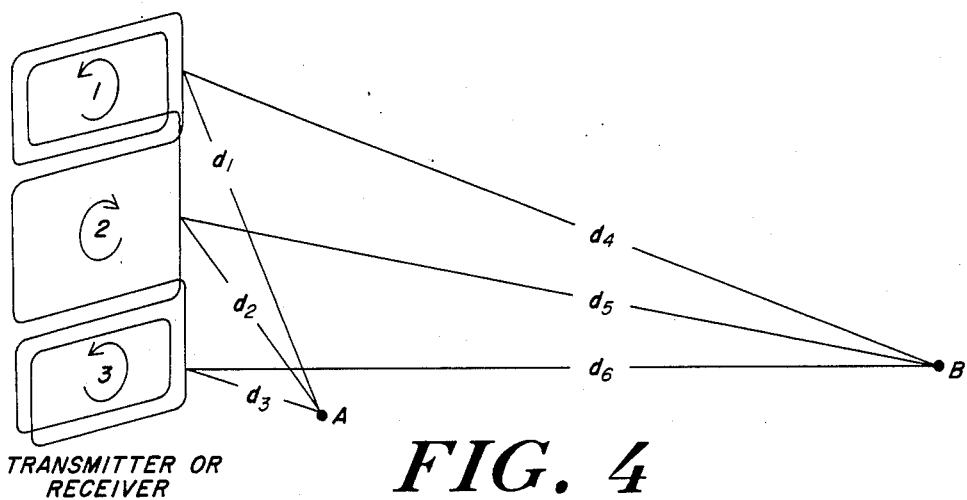
FIG. 4 is a schematic diagram illustrating principles of operation of an antenna in accordance with the invention.

Referring to FIG. 1, there is shown an electronic security system in which a transmitter 10 is coupled to an antenna 12 which provides a low frequency or radio frequency magnetic field in an interrogation zone which is the predetermined area to be controlled for security purposes. A separate receiving antenna 14 is operative to sense the magnetic field and provide a signal to a receiver 16, the output of which is coupled in turn to a band pass filter 18, amplifier 20, signal discrimination circuitry 22, and alarm 24. The band pass filter 18 is operative to pass only the intended frequency band and to remove the frequency components generated by the transmitter and high frequency noise. The amplifier 20 is typically a video amplifier operative to pass the signal from filter 18. The signal discrimination circuitry 22 includes noise rejection circuitry operative to discriminate between actual tag signals and spurious signals which could be falsely detected as a tag and therefore cause a false alarm.

The system can be implemented for detection of a tag 13 which is either a magnetic strip or other magnetic sensible element or a sensible resonant circuit. In systems for detection of a magnetic tag, the transmitter 10 generates a low frequency magnetic field via the antenna 12. The tag 13 is typically a high permeability magnetic strip which is capable of abrupt saturation to cause an abrupt change in the magnetic field. For systems in which the sensible tag 13 is a resonant circuit, the transmitter 10 and associated antenna 12 provide a radio frequency field for interrogation of the resonant circuit. The resonant circuit is sharply tuned to produce an abrupt change in the electromagnetic field when the frequency of the transmitter passes through the resonant frequency of the circuit. In either case, the abrupt change in the field caused by the resonant circuit or by the magnetic element is sensed by antenna 14 and receiver 16 to provide an output signal. This output signal is processed by the band pass filter, amplifier and signal discrimination circuitry to distinguish real tag signals from noise and other spurious signals, and if a real signal is detected, the alarm 24 is actuated.

The improved antenna in accordance with this invention, which is employed in the system of FIG. 1 for each of the transmitting and receiving antennas, is illustrated in one embodiment in FIG. 2. The antenna comprises three magnetic loops constructed in a single plane and of generally rectangular shape. The center loop 32 is in phase opposition to that of the outer loops 30 and 34. The upper and lower loops 30 and 34 each have, in the illustrated embodiment, two turns of wire around the same size area, while the center loop 32 has a single turn of wire around an area which is two-thirds the total loop area of the antenna. The loop area of both the upper and lower loops is equal to one-third of the total loop area. The antenna is symmetrical about a vertical centerline 45 and a horizontal centerline 36 through the middle loop 32. The loops are connected in series such that the current around all loops is equal.

The antenna generates three magnetic dipoles as illustrated in FIG. 3. Each magnetic dipole is a function of the number of turns of that loop, the current through the loop, and the area. The net magnetic dipole at large distances is zero. The magnetic phase of the upper and lower dipoles is in phase opposition to that of the center dipole, and the sum of the three magnetic dipoles is made equal to zero. Thus, the net magnetic field, seen from distances large compared to the dimensions of the antenna, is equal to zero. This situation is illustrated in FIG. 4. At large distances from the antenna, depicted by point B, the distances $d_4$, $d_5$ and $d_6$ are approximately equal, and the net field at point B is zero or approximately zero. However, at a distance close to the antenna, depicted by point A, the distances $d_1$, $d_2$ and $d_3$ are not equal to each other, and thus the net magnetic field at close distances to the antenna system is not zero.

In the embodiment of FIG. 2, the lower loop 34 is coupled to a transmitter when used for transmission purposes, and is coupled to a receiver when used for reception purposes. Of course, either end of the antenna can be coupled to a transmitter or receiver. For convenience, the antennas are often described herein as transmitter antennas providing certain near field and far field relationships. By the well-known principles of superposition, it is understood that the antenna used for receiving is similarly operable.

The antenna of FIG. 2 has each loop of the same width W, thus the area of each each loop is proportional to the vertical height of the loop. The magnetic dipole generated by each loop is proportional to the area of the loop multiplied by the number of turns of wire around the loop. In the illustrated implementation of FIG. 2 in which the center loop 32 has a single turn of wire, and each outer loop 30 and 34 has two turns of wire, and the height of each outer loop 30 and 34 is one-sixth of the total antenna height, and the height of the center loop 32 is two-thirds of the total antenna height, the dipoles are h/6 for each outer loop, and 2h/3 for the center loop. The term h is the total antenna height. If the outer loop has three turns, the outer loop dipoles are h/8, and the center loop dipole is 3h/4. If it is desired to increase the number turns for the entire antenna, then all turns for each loop can be multiplied by the same factor. The relative strength of the magnetic dipoles can thus be tailored to the specific installation requirements by selection of the relative loop areas and relative number of turns of the center and outer loops.

In the antenna of this invention, the sizes of the three loops can be adjusted to generate a net magnetic field of zero as seen from a distance, and net magnetic field of predetermined value at small distances. The size of the center loop can be made arbitrarily large compared to the outer loops so long as the ratio of the height and number of turns for each loop meets the criteria as described and as depicted in FIG. 2. As the size of the center loop is increased, the net coupling between the transmitting and receiving antennas increases and the net cancellation of magnetic coupling between the antennas is reduced. Thus, by increasing the size of the center loop, it is possible for the same size antenna and same transmitter antenna current to couple a greater carrier signal into the receiving antenna. This permits a greater spacing between the transmitting and receiving antennas, which is of importance in the electronic security system in which the antenna system is employed.

Moreover, the prime detection area in the security system is the center section or loop of the antenna. Therefore, as the detection area is enlarged, the performance of the system is improved. Thus, the antenna, according to the present invention, can be implemented in embodiments to suit the specific installation needs to control the net magnetic coupling between the transmitting and receiving antennas and provide a zero net magnetic field at large distances. The versatility of the present antenna system is especially important in electronic security systems. Since the coupling between transmitting and receiving antennas can be readily adjusted, the detection pattern between the antennas can be selected in accordance with the spacing desired between the transmitting and receving antennas, and in accordance with the net magnetic coupling required to introduce a carrier signal of intended strength into the receiver to overcome internal and external noise coupled into the receiver from the antenna system.

Figure 5:
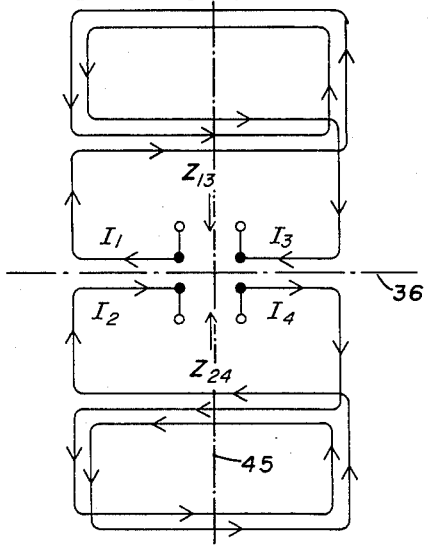
FIG. 5 is a diagrammatic representation of an alternative embodiment of the invention illustrating certain impedance relationships.
Figure 6:
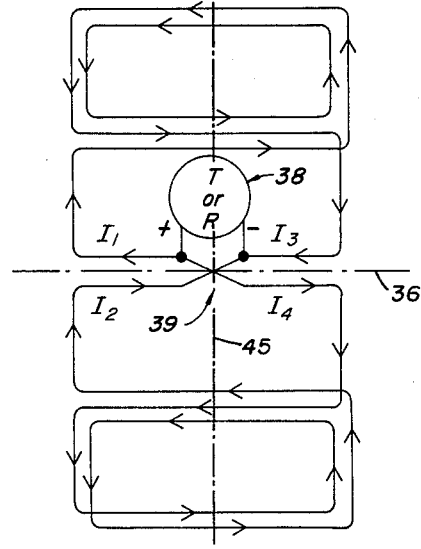
FIG. 6 is a diagrammatic representation of the embodiment of FIG. 5 connected to a transmitter or receiver.

In the antenna illustrated in FIG. 2, the antenna terminals are at the bottom of the antenna. Of course, the terminals could alternatively be at the top of the antenna. In any case, in this embodiment the antenna is coupled to the transmitter or receiver at an end. Since the dimensions of the antenna may be relatively large compared to the wavelength of the transmitter, there may be a significant phase shift from the point at which the antenna is driven (at one end) to the point furthest away from the driving point. In this case the currents through the three loops would not be in phase and the net magnetic moment generated by the three loops would not be zero. In the embodiment of FIGS. 5 and 6, the antenna is coupled to a transmitter or receiver 38 at its center to provide a precisely balanced antenna structure.

Referring to FIGS. 5 and 6, the center loop has two equal loops symmetrical about a centerline. The current $I_1$ is equal to $I_2$, and $I_3$ is equal to $I_4$. Thus, the net current at the crossover is zero and the crossover has no effect on the system. The impedance $Z_{13}$ looking into the upper half of the antenna is identical to the impedance $Z_{24}$ looking into the lower half of the antenna. If both halves of the antenna are driven in parallel, (as shown in FIG. 6) the net impedance of the antenna will be one-half of $Z_{13}$. If the antenna were driven from the end (as shown in FIG. 2), the impedance $Z_{13}$ would appear in series with the impedance $Z_{24}$, and the net impedance of the antenna would be two times $Z_{13}$. Thus, it can be seen that when the antenna is driven at the center, the antenna impedance is one-quarter the value when the antenna is driven from one end. The two symmetrical sections of the antenna are driven in parallel such that the currents in the crossover 39 cancel. This antenna has the unusual aspect of being formed of a continuous wire which is shorted to itself.

Figure 7:
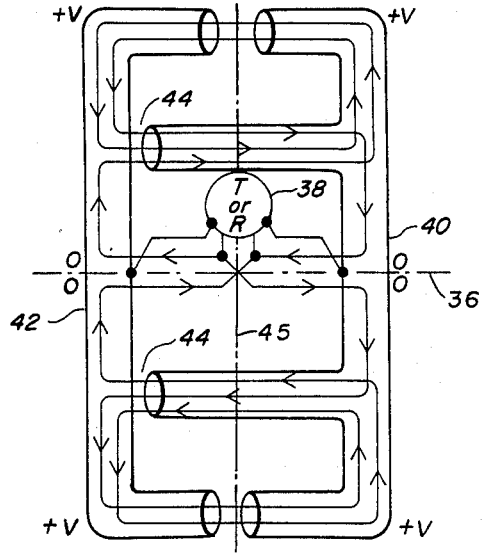
FIG. 7 is a diagrammatic representation of an embodiment of the invention similar to that of FIG. 6 and of shielded construction.

A further embodiment is shown in FIG. 7 and is a center driven antenna similar to that of FIG. 6. In the embodiment of FIG. 7, the antenna is symmetrically enclosed in a conductive pipe, tube or other enclosure in order to act as a Faraday shield against electrostatic and capacitive fields. The shields 40 and 42 are symmetric about a centerline 45 perpendicular with the horizontal centerline, are isolated from each other and are each symmetrically grounded to the common ground point of the transmitter or receiver of the system at the center of each shield. Since the magnetic dipole of each antenna is perfectly balanced, it is also possible to provide a totally shorted ground turn around the entire antenna as illustrated in the '808 patent. In this latter case, the shields 40 and 42 would be continuous around the periphery of the antenna, and isolated at points 44 as in FIG. 7.

Figure 8:
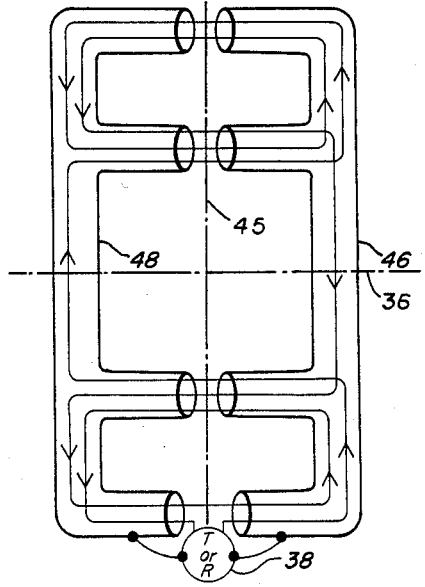
FIG. 8 is a diagrammatic representation of an embodiment similar to that of FIG. 2 and of shielded construction.

FIG. 8 shows an embodiment of the antenna which is end driven and which includes a shield composed of tubes 46 and 48. In this embodiment, the shield is grounded at one end to the common ground point of the transmitter or receiver 38.

The invention is not to be limited by what has been particularly shown and described except as indicated in the appended claims.

What is claimed is:

1. For use in an electronic security system having a transmitter for providing in a surveillance zone an electromagnetic field of a frequency which is repetitively swept over a predetermined frequency range, a resonant tag with at least one resonant frequency within the said swept frequency range, and a receiver for detecting the presence of said resonant tag in the surveillance zone and to provide an alarm indication thereof, an antenna system comprising:
   a transmitting loop antenna adapted for coupling to said transmitter;
   a receiving loop antenna adapted for coupling to said receiver;
   said transmitting loop antenna being substantially symmetrical about a geometric center dividing the antenna into two sections, both sections of said antenna being driven by said transmitter at the geometric center such that the magnetic field caused by the opposite symmetrical sections of said antenna are in phase opposition and substantially cause cancellation of the magnetic field at distances large compared to the dimensions of the antenna.

2. The system of claim 1 wherein said receiving antenna is substantially identical to said transmitting antenna.

3. The receiving antenna of claim 2 wherein said receiver is coupled to said receiving antenna at the geometric center of the symmetrical sections of said receiving antenna.

4. The antenna of claim 2 wherein the receiving loop antenna is substantially electrostatically shielded by enclosing the current carrying members of said antenna in an electrically conductive closed surface, said conductive surface being split in at least two places so that the split lines are at right angles to the line of symmetry of the loop antenna sections.

5. The electrostatic shield of claim 4 wherein the shield is symmetrical about the same line of symmetry as the loop antenna.

6. The electrostatic shield of claim 4 wherein both sections of said shield are grounded together and to the receiver ground at a point substantially on the line of symmetry of said loop antenna.

7. The receiving antenna of claim 2 wherein said antenna has three twisted loops lying in a common plane, each loop being in phase opposition with each adjacent loop and the sum of the number of turns in each of the outer loops times the area of each of the outer loops is equal to the total area of the center loop multiplied by the number of turns of the center loop.

8. The antenna of claim 7 wherein the antenna is substantially electrostatically shielded by enclosing the current carrying members of said antenna in a closed electrically conductive surface.

9. The shield of claim 8 wherein the conductive surface of the shield is split in at least two places, each split providing two pieces of substantially equal lengths, wherein the split lines of the shield are at a right angle with respect to the line of symmetry of said antenna.

10. The shield of claim 8 wherein the electrostatic shield is symmetrical about the same line of symmetry as the loop antenna.

11. The antenna system of claim 1 wherein the transmitting loop antenna is substantially electrostatically shielded by enclosing the current carrying members of said antenna in an electrically conductive closed surface, said conductive surface being split in at least two places to that the split lines are at right angles to the line of symmetry of the loop antenna sections forming opposing shield members symmetrical about the split lines.

12. The electrostatic shield of claim 11 wherein the shield is symmetrical about the same line of symmetry as the loop antenna.

13. The electrostatic shield of claim 11 wherein both sections of said shield are grounded together and to the transmitter ground at a point substantially on the line of symmetry of said loop antenna.

14. The transmitting antenna of claim 1 wherein said antenna has three twisted loops lying in a common plane, each loop being in phase opposition with each adjacent loop and the sum of the number of turns in each of the outer loops times the area of each of the outer loops is equal to the total area of the center loop multiplied by the number of turns of the center loop.

15. The antenna of claim 14 wherein the antenna is substantially electrostically shielded by enclosing the current carrying members of said antenna in a closed electrically conductive surface.

16. The shield of claim 15 wherein the conductive surface of the shield is split in at least two places each split providing two pieces of substantially equal lengths wherein the split lines of the shield are at a right angle with respect to the line of symmetry of said antenna.

17. The shield of claim 15 wherein the electrostatic shield is symmetrical about the same line of symmetry as the loop antenna.

18. The shield of claim 15 wherein the electrostatic shield is symmetrical about a line of symmetry which is at right angles to the line of symmetry of the loop antenna.

19. For use in an electronic security system having a transmitter for producing a magnetic field in a surveillance zone, a receiver for detecting disturbances to said magnetic field, and a device which can cause disturbances to said magnetic field, an antenna system comprising:
a transmitting loop antenna adapted for coupling to said transmitter;
a receiving loop antenna adapted for coupling to said receiver;
said transmitting loop antenna being substantially symmetrical about a geometric center of the loop antenna dividing the antenna into two sections, both sections of said antenna being driven by said transmitter at the geometric center such that the magnetic field caused by the opposite symmetrical sections of said antenna are in phase opposition and substantially cause cancellation of the magnetic field at distances large compared to the dimensions of the antenna.

20. The system of claim 19 in which said receiving antenna is substantially identical to said transmitting antenna.

21. The receiving antennas of claim 20 wherein said receiver is coupled to said receiving antenna at the geometric center of the symmetrical sections of said receiving antenna.

22. The antenna of claim 20 wherein the receiving loop antenna is substantially electrostatically shielded by enclosing the current carrying members of said antenna in an electrically conductive closed surface, said conductive surface being split in at least two places so that the split lines are at right angles to the line of symmetry of the loop antenna sections.

23. The electrostatic shield of claim 22 wherein the shield is symmetrical about the same line of symmetry as the loop antenna.

24. The electrostatic shield of claim 22 wherein both sections of said shield are grounded together and to the receiver ground at a point substantially on the line of symmetry of said loop antenna.

25. The receiving antenna of claim 20 wherein said antenna has three twisted loops lying in a common plane, each loop being in phase opposition with each adjacent loop and the sum of the number of turns in each of the outer loops times the area of each of the outer loops is equal to the total area of the center loop multiplied by the number of turns of the center loop.

26. The antenna of claim 25 wherein the antenna is substantially electrostatically shielded by enclosing the current carrying members of said antenna in a closed electrically conductive surface.

27. The antenna of claim 26 wherein the antenna is substantially electrostatically shielded by enclosing the current carrying members of said antenna in a closed electrically conductive surface.

28. The shield of claim 27 wherein the conductive surface of the shield is split in at least two places so that the split lines of the shield are at a right angle with respect to the line of symmetry of said antenna.

29. The shield of claim 28 wherein the conductive surface of the shield is split in at least two places so that the split lines of the shield are at a right angle with respect to the line of symmetry of said antenna.

30. The shield of claim 27 wherein the electrostatic shield is symmetrical about the same line of symmetry as the loop antenna.

31. The receiving antenna of claim 20 wherein said antenna is composed of a multitude of twisted loops lying in a common plane, each loop being in phase opposition with each adjacent loop, and the sum of the number of turns of each loop times the area of that loop of all said loops in one phase being equal to the sum of the number of turns of each loop times the area of that loop of all said loops of opposite phase.

32. The antenna system of claim 19 wherein the transmitting loop antenna is substantially electrostatically shielded by enclosing the current carrying members of said antenna in an electrically conductive closed surface, said conductive surface being split in at least two places so that the split lines are at right angles to the line of symmetry of the loop antenna sections forming opposing shield members symmetrical about the split lines.

33. The electrostatic shield of claim 32 wherein the shield is symmetrical about the same line of symmetry as the loop antenna.

34. The transmitting antenna of claim 19 wherein said antenna has three twisted loops lying in a common plane, each loop being in phase opposition with each adjacent loop and the sum of the number of turns in each of the outer loops times the area of each of the outer loops is equal to the total area of the center loop multiplied by the number of turns of the center loop.

35. The transmitting antenna of claim 19 wherein said antenna is composed of a multitude of twisted loops lying in a common plane, each loop being in phase opposition with each adjacent loop, and the sum of the number of turns of each loop times the area of that loop of all said loops in one phase being equal to the sum of the number of turns of each loop times the area of that loop of all said loops of opposite phase.

* * * * *